United States Patent [19]

Schnell et al.

[11] 4,212,903

[45] Jul. 15, 1980

[54] IMPROVING THE MAGNETIC PROPERTIES OF GAMMA-IRON (III) OXIDE

[75] Inventors: Georg Schnell; Fritz Hammon, both of Ludwigshafen; Manfred Ohlinger, Frankenthal, all of Fed. Rep. of Germany

[73] Assignee: BASF Aktiengesellschaft, Fed. Rep. of Germany

[21] Appl. No.: 770,989

[22] Filed: Feb. 22, 1977

Related U.S. Application Data

[63] Continuation of Ser. No. 490,619, Jul. 22, 1974, abandoned.

[30] Foreign Application Priority Data

Nov. 9, 1972 [DE] Fed. Rep. of Germany ....... 2254810

[51] Int. Cl.$^2$ .................... H01F 10/00; B05D 5/12
[52] U.S. Cl. .................................. 427/127; 428/900
[58] Field of Search .................... 427/48, 127–132; 428/900

[56] References Cited

U.S. PATENT DOCUMENTS

| | | | |
|---|---|---|---|
| 3,370,979 | 2/1968 | Schmeckenbecher | 427/132 X |
| 3,573,980 | 4/1971 | Haller et al. | 252/62.56 |
| 3,697,322 | 10/1972 | Lee et al. | 148/113 |
| 3,941,621 | 3/1976 | Lee et al. | 148/27 |

*Primary Examiner*—Bernard D. Pianalto
*Attorney, Agent, or Firm*—Keil & Witherspoon

[57] ABSTRACT

The invention relates to a process for improving the magnetic properties, especially the remanent magnetization, of gamma-iron(III) oxide which can be used advantageously as the magnetic component in magnetic recording media exhibiting reduced print-through. For this purpose, a gamma-iron(III) oxide manufactured according to known processes is heated at temperatures of from 400° to 700° C., the magnetic pigment having basic compounds on the crystal surface during this heat treatment and retaining a pH value above 8 until heating is over. Gamma-iron(III) oxide magnetic pigments treated in this way are particularly suitable for the manufacture of low-noise magnetic recording media with high remanent magnetization and particularly low print-through.

5 Claims, No Drawings

IMPROVING THE MAGNETIC PROPERTIES OF GAMMA-IRON (III) OXIDE

This is a continuation, of application Ser. No. 490,619 filed July 22, 1974 and now abandoned.

The invention relates to a process for improving the magnetic properties of gamma-iron (III) oxide ($\gamma$-$Fe_2O_3$) by a special heat treatment.

The magnetic pigment used predominantly for magnetic recording media is acicular gamma-iron(III) oxide ($\gamma$-$Fe_2O_3$) which is usually manufactured industrially from $\alpha$-FeOOH by dehydrating the latter to $\alpha$-$Fe_2O_3$ at elevated temperatures and reducing this to magnetite, $Fe_3O_4$, which is oxidized to $\gamma$-$Fe_2O_3$ with air at temperatures of 100° to 400° C. In the oxidation to $\gamma$-$Fe_2O_3$, particular care must be taken to ensure that temperatures above 400° C. do not occur, even locally, because the $\gamma$-$Fe_2O_3$ is otherwise converted into stable non-magnetic $\alpha$-$Fe_2O_3$ (cf. Ullmanns Encyklopädie der technischen Chemie, 3rd Edition, Volume 12, page 164, Munich-Berlin, 1960, and French Patent No. 1,112,816). In this method of manufacturing $\gamma$-$Fe_2O_3$, which proceeds via various iron oxide modifications, with restructuring of the crystal lattices, lattice defects and imperfections arise in the crystal, which lead to adverse changes in the electroacoustic and magnetic properties of the ferromagnetic iron oxide pigments. Processes intended to the properties of the pigment merely by heating the $\alpha$-FeOOH or $Fe_3O_4$ are therefore less effective since during the transition to the $\gamma$-$Fe_2O_3$ modification lattice defects again occur and have an adverse influence on the properties of the pigment. Again, curing the lattice defects of the $\gamma$-$Fe_2O_3$ modification by heat treatment is not possible since, as has been stated, $\gamma$-$Fe_2O_3$ changes monotropically, above 400° C., into paramagnetic $\alpha$-$Fe_2O_3$ having a corundum structure, and this manifests itself in a decrease in the magnetic flux and a change in color from brown to red.

We have now found that, surprisingly, the ferromagnetic $\gamma$-$Fe_2O_3$ modification can be heated for several hours at temperatures above 400° C. without a detectable loss in the magnetic flux, if, and as long as, the pH value of the pigment is kept above 8 and preferably above 9 during the process.

Accordingly, the invention relates to a process for improving the magnetic properties of gamma-iron(III) oxide pigments, wherein a gamma-iron(III) oxide pigment is heated at temperatures between 400° and 700° C., the pigment having basic compounds, preferably basic hydroxides, on the crystal surface during this heat treatment, and retaining a pH value above 8 until heating is over.

The process according to the invention makes it possible to delay the monotropic transformation of the $\gamma$-$Fe_2O_3$ modification into the $\alpha$-$Fe_2O_3$ modification, or to displace the transformation toward higher temperatures, to such an extent that it is possible to heat the $\gamma$-$Fe_2O_3$ modification at temperatures at which the thermal energy of the crystal elements suffices to substantially cure lattice defects. The process according to the invention, on the one hand, achieves thermal stabilization of the $\gamma$-$Fe_2O_3$ modification and, on the other, a distinct improvement in the magnetic and electroacoustic properties of the $\gamma$-$Fe_2O_3$ pigments. Thus, a distinct increase in the remanent magnetization is achieved. In addition, the heat-treated oxides exhibit reduced print-through and thus have, as magnetic pigments in recording media, electroacoustic properties which are required for studio and broadcasting applications.

The wide variety of uses to which magnetic recording media are put demands that in a suitable magnetic oxide pigment certain electroacoustic properties should be particularly pronounced. Thus, for studio and broadcasting purposes, more importance is attached to reduced print-through than to extreme low-noise properties. Conversely, in the case of magnetic tapes for amateur use and customary compact cassette tapes, a low-noise magnetic oxide pigment exhibiting reduced print-through is used. These necessary compromises usually demand the use of different magnetic oxide pigments and different dispersions and entail a great deal of labor for the tape manufacturer because the various types of oxide have to be stocked separately, dispersed separately, etc. The process according to the invention makes it possible to produce low-noise, high-output $\gamma$-iron pigments exhibiting reduced print-through, which can thus be used in all fields of application. The heat treatment according to the invention does not modify such properties as signal-to-noise ratio and frequency response since no detectable external changes occur at the crystal. The particle size distribution and specific pigment surface area remain unchanged after the heat treatment of the invention.

The essential feature of the invention is that during heating at 400° to 700° C. and preferably at 450° to 550° C. the pigment is at all times basic on the crystal surface and has a pH value of above 8, preferably above 9, until heating is over.

The pH value of the dry magnetic pigment is determined by suspending a 10 g portion of the pigment concerned in 100 ml of distilled water and stirring the suspension at room temperature until the pH-meter reading becomes constant, which is generally the case after about 15 minutes.

The OH ion concentration and the basicity of the pigment can be adjusted in the conventional way be means of any basic compound or proton acceptor which, as a result of possessing a sufficiently low volatility, is able to maintain basicity or an appropriate hydroxyl group concentration on the pigment surface during the heat treatment, such as inorganic basic metal compounds and especially basic compounds of metals of main group I and II of the Periodic Table, such as the basic alkali metal hydroxides and alkaline earth metal hydroxides, for example sodium hydroxide, potassium hydroxide and calcium hydroxide. Preferably, the starting pigment is sprayed or stirred with basic compounds which are water-soluble or of which the salts are water-soluble, and which can, after heating, be removed readily by elution of the oxides, such as alkali metal hydroxides and alkaline earth metal hydroxides, for example substances of this type in pulverulent form or as solutions; treating the pigments with dilute aqueous alkali metal hydroxide solutions or alkaline earth metal hydroxide solutions and especially with aqueous sodium hydroxide solution or potassium hydroxide solution has proved very advantageous. Suitable embodiments of the process according to the invention can be readily evolved by those skilled in the art by means of a few preliminary experiments, in the light of the teaching according to the invention. In the case of an $\alpha$-FeOOH manufactured by an acid process it is advantageous to treat the pigment with a base, for example a dilute alkali metal hydroxide solution, before or after conversion into $\gamma$-$Fe_2O_3$, and to adjust the pH to a value which ensures that during heating the pH value of the pigment does not fall below 8 as a result of protons liberated during heating. An α-FeOOH manufactured in alkaline medium is advantageously not washed or only washed to such an extent that after drying and conversion into γ-Fe$_2$O$_3$ the pigment still has a pH value of at least 8.

It is of particular interest and importance that even γ-iron(III) oxides which have been modified with foreign elements in a conventional way in order to improve the magnetic properties, and which generally contain from about 0.08 to about 15 percent by weight of a foreign metal, such as cobalt or manganese, can be subjected to the heat treatment according to the invention and that their magnetic properties can be improved even further thereby.

The parts and percentages specified in the following Examples and Comparative Experiments are by weight, unless otherwise stated. Parts by volume bear the same relation to parts by weight as the liter to the kilogram.

The magnetic measurements were made with a vibrating-sample magnetometer. Samples of the pigments were placed in cylindrical tubes and tamped until the tap density was approx. 1.0 g/cm$^3$, and measured in a uniform magnetic field of 1,500 gauss. Pigments having a higher coercive force such as cobalt-modified iron oxide, were measured at 2,000 gauss. The coercive force ($H_c$) is given in oersteds and the specific remanence ($4\pi\delta_R$) and the specific saturation magnetization ($4\pi\delta_S$) are given in gauss$\times$cm$^3\times$g$^{-1}$.

EXAMPLES 1 TO 3

α-FeOOH manufactured in alkaline medium is eluted with water until the effluent has a pH of 9.0. After drying, the α-FeOOH is then oxidized in a conventional manner to α-Fe$_2$O$_3$, which is reduced to magnetite and oxidized to γ-Fe$_2$O$_3$. The resulting γ-Fe$_2$O$_3$ (starting oxide) has a pH value of 9.8 and the following magnetic values:
$H_c=339$; $4\pi\sigma_R=380$; $4\pi\sigma_S=782$.

EXAMPLE 1

Some of the starting oxide is heated for 130 minutes at 450° C. and then exhibits the following magnetic values: $H_c=343$; $4\pi\sigma_R=432$; $4\pi\sigma_S=796$.

EXAMPLE 2

Some of the starting oxide is heated for 240 minutes at 550° C. and then exhibits the following magnetic values: $H_c=353$; $4\pi\sigma_R=425$; $4\pi\sigma_S=792$.

EXAMPLE 3

Some of the starting oxide is heated for 30 minutes at 625° C. and then exhibits the following magnetic values: $H_c=347$; $4\pi\sigma_R=421$; $4\pi\sigma_S=787$.

COMPARATIVE EXPERIMENT A

Some of the starting oxide used in Examples 1 to 3 is washed with dilute aqueous sulfuric acid so that the pH value of the dried powder is 5.5. After heating for 130 minutes at 450° C. the pigment has the following magnetic values: $H_c=362$; $4\pi\sigma_R=331$; $4\pi\sigma_S=675$.

COMPARATIVE EXPERIMENT B

Some of the starting oxide used in Examples 1 to 3 is adjusted to a pH value of 4.0 with dilute aqueous sulfuric acid and then dried and heated for 130 minutes at 450° C., after which the pH value has risen to 4.5 and the oxide has the following values:
$H_c=343$; $4\pi\sigma_R=293$; $4\pi\sigma_S=512$.

COMPARATIVE EXPERIMENT C

The procedure of Comparative Experiment B is followed except that the oxide is heated for 2 hours at 500° C. The resulting oxide has the following magnetic values:
$H_c=325$; $4\pi\sigma_R=138$; $4\pi\sigma_S=373$.

EXAMPLE 4

A γ-Fe$_2$O$_3$ having a pH value of 2.5 has the following magnetic values (starting pigment):
$H_c=334$; $4\pi\sigma_R=368$; $4\pi\sigma_S=685$.

100 parts of this starting pigment are stirred with 3,000 parts by volume of 10% strength aqueous sodium hydroxide solution for 1 hour at 100° C. After filtering off the pigment (without washing) and drying it at 110° C., the pH value of the pigment is 12.6. The pigment is heated for 1 hour at 500° C. and its pH value is then 11.55. The γ-Fe$_2$O$_3$ is then washed and dried and has the following magnetic values:
$H_c=328$; $4\pi\sigma_R=375$; $4\pi\sigma_S=680$.

COMPARATIVE EXPERIMENT D

The starting pigment of Example 4 is merely heated for 1 hour at 500° C. This converts the γ-Fe$_2$O$_3$ into an α-Fe$_2$O$_3$ pigment which because of its very poor magnetic values is completely unsuitable for use as a magnetic pigment.

COMPARATIVE EXPERIMENT E 100 parts of the starting pigment of Example 4 are stirred with 3,000 parts by volume of 10% strength aqueous sodium hydroxide solution for 1 hour at 100° C. The pigment is filtered off and washed until the pH value of the filtrate is 10.0. After drying at 110° C. the pigment is heated for 1 hour at 500° C. and then has a pH value of 6.4. The pigment is then washed and dried and exhibits the following magnetic values:
$H_c=289$; $4\pi\sigma_R=28$; $4\pi\sigma_S=67$.

EXAMPLE 5

A γ-Fe$_2$O$_3$ treated with ammonia and having a pH value of 8.8 has the following magnetic values:
$H_c=320$; $4\pi\sigma_R=371$; $4\pi\sigma_S=444$.

It is heated for 1 hour at 550° C. The resulting oxide has the following magnetic values:
$H_c=332$; $4\pi\sigma_R=346$; $4\pi\sigma_S=747$.

EXAMPLE 6

γ-Fe$_2$O$_3$ which has been modified with 3% of cobalt and whose pH value has been adjusted to 8.2 with sodium hydroxide solution has the following magnetic values:
$H_c=488$; $4\pi\sigma_R=438$; $4\pi\sigma_S=784$.

After heating for 2 hours at 500° C. and elution, the pigment has the following magnetic values:
$H_c=418$; $4\pi\sigma_R=454$; $4\pi\sigma_S=787$.

COMPARATIVE EXPERIMENT F

A sample of the starting oxide of Example 6 is acidified with 10% strength aqueous sulfuric acid and eluted until the pH value of the wash water is 4. After drying at 110° C. the oxide is heated for 2 hours at 500° C. The resulting pigment has the following magnetic values:
$H_c=337$; $4\pi\sigma_R=158$; $4\pi\sigma_S=444$.

EXAMPLE 7 AND COMPARATIVE EXPERIMENT G

Magnetic recording media having a polyethylene terephthalate base are manufactured by the same conventional method using $\gamma$-$Fe_2O_3$ heated in accordance with the invention, as in Example 2, and unheated $\gamma$-$Fe_2O_3$ (starting oxide of Examples 1 to 3). To manufacture the magnetic coating, the pigments are dispersed in the same way in a partially saponified vinyl chloride/vinyl acetate copolymer, with the addition of a mixture of equal parts by volume of tetrahydrofuran and toluene. The thickness of the magnetic coating is 13$\mu$. The magnetic properties are determined on the resulting magnetic tapes:

|  | Example 7 (heated) | Comparative Experiment G (unheated) |
| --- | --- | --- |
| Coercive force $H_c$ (oersteds) | 345 | 305 |
| Remanent magnetization [gauss × cm$^3$ × g$^{-1}$] | 1,200 | 1,200 |
| Signal-to-bias noise ratio according to DIN 45,512 [db] Tape speed 38 cm/sec. | 62 | 62 |
| Maximum output level according to DIN 45,512 [db] | +8 | +8 |
| Signal-to-print-through ratio according to DIN 45,519 [db] | 57 | 51 |
| Frequency response according to DIN 45,512 [db] | +2 | 0 |

We claim:

1. A process for improving the magnetic properties of gamma-iron(III) oxide pigments which comprises:
    applying to said gamma-iron(III) oxide pigments a basic compound selected from the group consisting of alkali metal hydroxides and alkaline earth metal hydroxides to provide a pigment crystal surface having a pH above 8, which basic compounds can be removed by elution of the said pigments after they have been heated at a temperature of from 400° to 700° C., and
    heating said pigments at a temperature of from 400° to 700° C., said surface crystal pH remaining above 8 throughout said heating step, whereby the magnetic properties of said pigments are improved.

2. A process as claimed in claim 1, wherein the pigment is heated at 450° to 550° C.

3. A process as set forth in claim 1 wherein said basic compound is sodium hydroxide.

4. A process as claimed in claim 1, wherein cobalt-modified gamma-iron(III) oxides are heated.

5. A process as set forth in claim 1 wherein the surface crystal pH of the pigments remains above 9 during the heating step.

* * * * *